(12) United States Patent
Loaiza et al.

(10) Patent No.: US 7,020,835 B2
(45) Date of Patent: *Mar. 28, 2006

(54) ENHANCEMENTS TO DATA INTEGRITY VERIFICATION MECHANISM

(75) Inventors: Juan R. Loaiza, Redwood City, CA (US); Wei-Ming Hu, Palo Alto, CA (US); Jingling William Lee, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 10/133,002

(22) Filed: Apr. 25, 2002

(65) Prior Publication Data

US 2003/0140288 A1  Jul. 24, 2003

Related U.S. Application Data

(63) Continuation-in-part of application No. 09/765,680, filed on Jan. 18, 2001.

(60) Provisional application No. 60/241,959, filed on Oct. 19, 2000.

(51) Int. Cl.
  G06F 11/00 (2006.01)
  G11C 29/00 (2006.01)
  G11B 5/09 (2006.01)

(52) U.S. Cl. ............... 714/807; 714/763; 360/53

(58) Field of Classification Search ............ 714/48, 714/49, 52, 800, 801, 805, 807, 819, 824, 714/763, 764, 765, 768, 758, 712, 718, 719
See application file for complete search history.

(56) References Cited

U.S. PATENT DOCUMENTS

| 5,146,571 | A | 9/1992 | Logan |
| 5,182,752 | A | 1/1993 | DeRoo et al. |
| 5,233,618 | A | 8/1993 | Glider et al. |
| 5,588,012 | A | 12/1996 | Oizumi |
| 5,696,775 | A | 12/1997 | Nemazie et al. |
| 5,805,799 | A | 9/1998 | Fredrickson et al. |
| 6,009,542 | A | 12/1999 | Koller et al. |
| 6,098,190 | A | 8/2000 | Rust et al. |

(Continued)

FOREIGN PATENT DOCUMENTS

EP   0 503 417 A2   9/1992

OTHER PUBLICATIONS

Antoni Cau, et al., "Specifying Fault Tolerance within Stark's Formalism," 1993, IEEE, pp. 392-401.

(Continued)

*Primary Examiner*—Christine T. Tu
(74) *Attorney, Agent, or Firm*—Hickman Palermo Truong & Becker, LLP; Edward A. Becker

(57) ABSTRACT

A method and apparatus is provided for maintaining data integrity. According to the method, a physical checksum calculation is performed on a block of data. After performing the physical checksum calculation, a logical check is performed on the data contained with the block of data. If the block of data passes the logical check, then the block of data may be written to nonvolatile memory. Thereafter, when the block of data is read from nonvolatile memory a physical checksum verification procedure is performed on the block of data to determine whether the block of data was corrupted after performing the logical check on the data contained with the block of data.

29 Claims, 11 Drawing Sheets

U.S. PATENT DOCUMENTS

| | | |
|---|---|---|
| 6,324,661 B1 | 11/2001 | Gerbault et al. |
| 6,438,724 B1 | 8/2002 | Cox et al. |
| 6,446,234 B1 | 9/2002 | Cox et al. |
| 6,560,743 B1 * | 5/2003 | Plants ........................ 714/763 |
| 2002/0049950 A1 | 4/2002 | Loaiza et al. |

OTHER PUBLICATIONS

IBM Corp., "IBM OS/2 Extended Edition Configuration," Feb. 1990, IBM Technical Disclosure Bulletin, vol. 32, No. 9B, pp. 446-451.

* cited by examiner

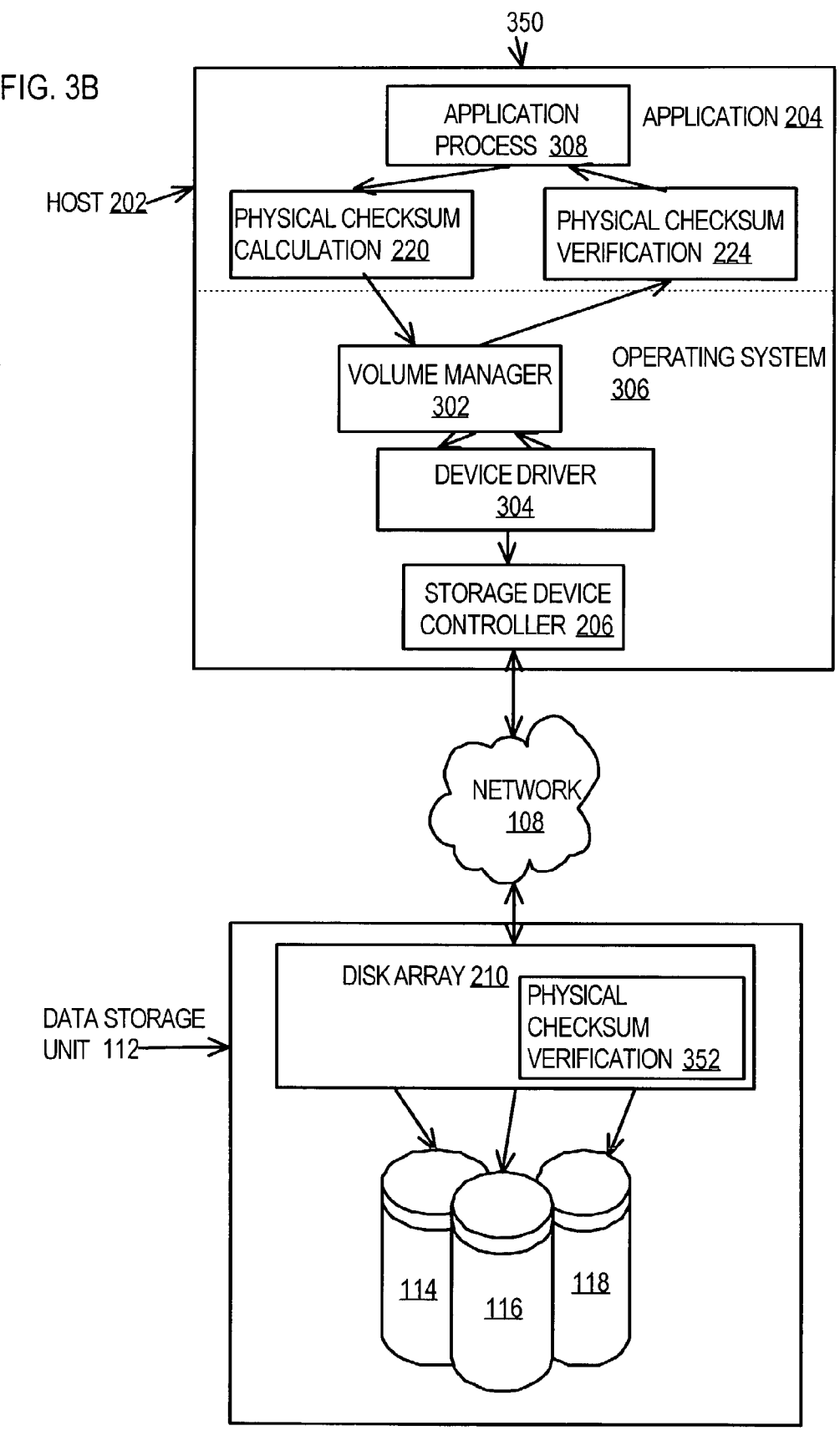

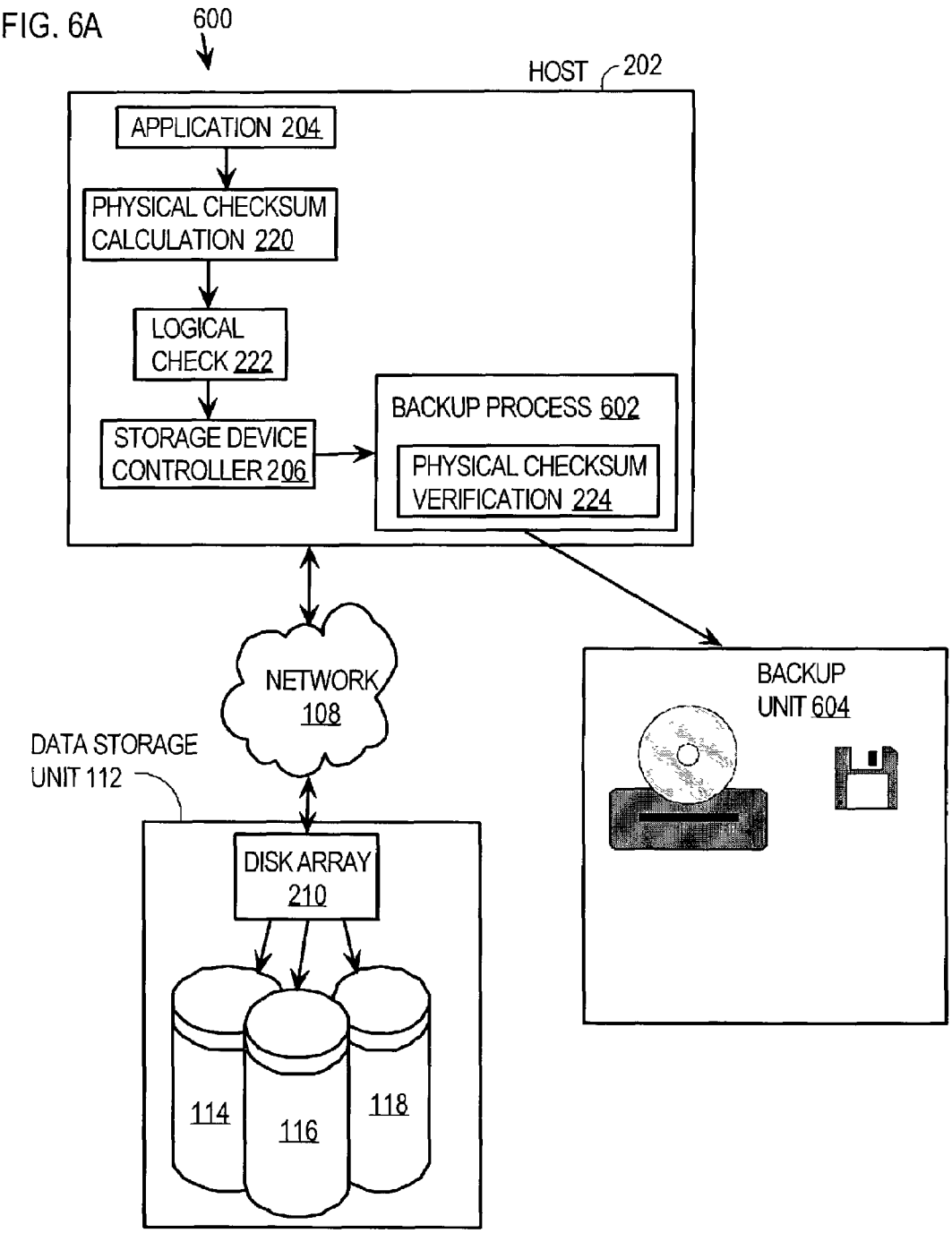

ENHANCEMENTS TO DATA INTEGRITY VERIFICATION MECHANISM

CLAIM OF PRIORITY

This application is a continuation-in-part application of and claims priority to U.S. patent application Ser. No. 09/765,680 filed by Juan R. Loaiza, Wei-Ming Hu and Jingling William Lee on Jan. 18, 2001 and entitled "Data Integrity Verification Mechanism," and claims priority to U.S. Provisional Patent Application No. 60/241,959 filed by Wei-Ming Hu, Juan R. Loaiza, and Jingling William Lee on Oct. 19, 2000 and entitled "Data Integrity Verification Mechanism," the contents of which are hereby incorporated by reference in their entirety for all purposes.

FIELD OF THE INVENTION

The present invention relates generally to data integrity in computer applications, and more specifically, to a data integrity verification mechanism.

BACKGROUND OF THE INVENTION

Society has become extremely dependent upon computers. In today's world, computers are used for everything from financial planning, to company payroll systems, to aircraft guidance systems. Because of the wide spread use of computers systems, data corruption is a problem that can affect almost any individual and an issue that continues to plague both the computer hardware and computer software industries.

For example, software applications, such as database applications, are extremely dependent upon maintaining the integrity of their data. If the data associated with a database application is corrupted, users may experience incorrect results and possibly system crashes.

Data corruption may result for a variety of reasons and from a variety of different sources. For example, a software "bug" in a database application may itself cause invalid data, such as a negative social security number or invalid pointer address, to be stored in a table or data structure. In addition, other programs executing on the same computer system, including the operating system itself, may inadvertently over-write certain variables, tables, data structures, or other similar types of information, thus corrupting the data that is associated with a particular software application. Still further, when an application writes a block of data to a storage medium, the data typically travels through many intermediate layers of software and hardware before it is actually stored to the storage medium. Hence, there is even a further potential for the data block to become corrupted prior to, or at the time it is being written to the storage medium.

For example, when writing a data block to disk, the data may travel from the software application to a volume manager, from the volume manager to a device driver, from the device driver to a storage device controller, and from the storage device controller to a disk array before being stored onto disk. When the data block is later read from the disk, the data must again travel through the same set of software and hardware layers before it can be used by the software application. Thus, a bug at any of these layers may potentially corrupt the data. Additionally, if the disk is unstable, thus causing errors to be introduced into the data after it is written to disk, the integrity of the data may be compromised even if the other layers do not erroneously alter the data.

Conventionally, data locking schemes provide one method for maintaining the integrity of data that is associated with a particular application. By locking the data so as to deny access by other applications, the operating system can generally warrant that data associated with one application is not over-written or corrupted by another application.

However, conventional locking schemes do not protect against such problems as media failures or bugs in disk drivers or other low level firmware. Moreover, the operating system may itself contain bugs that erroneously cause data to be overwritten and/or corrupted. Thus, conventional locking schemes cannot consistently ensure that the integrity of the data will always be maintained or that corrupted data is never stored to a storage medium.

One method for identifying corrupted data that has been stored on disk is through the use of logical checks and physical checksums. A logical check is a mechanism whereby the integrity of the data is determined by comparing the data to certain predetermined characteristics that are expected to be associated with the data values. For example, if a column in table A includes a set of pointers that are to index a specific row of table B, if any of the pointers has an address value that is not associated with a row of table B, that pointer may be identified as having a corrupted address value. Similarly, if a particular column in a table is configured for storing employee telephone numbers, if the value in any row for that column is determined to be negative, that value can be identified as corrupted.

FIG. 1 illustrates one method for determining the integrity of data that is retrieved from disk by an application. In this example, a user has interacted with application 104 to generate and/or update a block of data that is associated with application 104. For example, the block of data may include updated information for certain tables of a database. To store the data block to disk, a logical check 120 is first performed on the data to verify its integrity. Next, a physical checksum calculation 122 is preformed to calculate and store a checksum value within the data block. The physical checksum calculation 122 provides a mechanism whereby subsequent changes to the bit pattern of the data block may be identified when the data is read back from disk. For example, a checksum value may be calculated and stored within the data block so that when a logical operation, such as an exclusive-or (XOR) operation, is applied to the bits within the data block, a checksum constant such as zero is calculated. Thereafter, the data block is sent to storage device controller 106 and then from storage device controller 106 to disk array 110, possibly via a network 108, for storage on one or disks 114–118.

Afterwards, if application 104 again requires the updated information contained in the data block, the data block must again travel through several layers (i.e., from the one or disks 114–118 to disk array 110 and from disk array 110 to storage device controller 106 over network 108) before it can be used by application 104. To determine the integrity of the data block, a physical checksum verification process is performed to verify that the data block still has the correct checksum constant value. If it is determined that the data block still has the correct checksum constant value, then a logical check 126 is performed on the data to verify that that data block was not corrupted between the time when logical check 120 was performed and the time when physical checksum calculation 122 was preformed.

However, a drawback with the described method for verifying the integrity of a data block is that performing a logical check on the information within the data block requires a significant amount of time and resources (overhead). For many applications that require a large number of data blocks to be continually written and read from disk, for example database applications, the additional overhead can dramatically affect the efficiency and response time of the application.

In addition, another drawback with the described method is that it allows for corrupted data to be written to disk. For example, if the data is corrupted after the logical check 120 is performed, the data will still be written to disk after physical checksum calculation 122 is performed. However, for many applications, specifically non-transaction based applications, the writing of corrupted data to disk can have a catastrophic effect as the invalid changes cannot be easily backed-out.

Based on the foregoing, there is a need for a mechanism for reducing the overhead that is typically associated with storing and retrieving data from disk.

There is also a need for a mechanism that reduces the likelihood that corrupted data is written to disk.

In addition, there is also a need for mechanism that increases the likelihood that data is written to the correct area on disk.

SUMMARY OF THE INVENTION

According to one aspect of the invention, techniques are provided for maintaining data integrity. According to one technique, a physical checksum calculation is performed on a block of data. After performing the physical checksum calculation, a logical check is performed on the data contained with the block of data. If the block of data passes the logical check, then the block of data may be written to nonvolatile memory.

According to one feature, when the block of data is written to or read from nonvolatile memory a physical checksum verification procedure is performed on the block of data to determine whether the block of data was corrupted after performing the logical check on the data contained with the block of data. The physical checksum verification may be performed in a storage device or another location, depending upon the requirements of a particular application.

According to another aspect of the invention, a method is provided for evaluating a data block. The method includes performing a physical checksum verification on the data block. The method also includes verifying whether address data contained within the data block specifies a location in nonvolatile memory where the data block is to be stored.

According to another aspect of the invention, a method is provided for storing a data block to a nonvolatile memory. The method includes performing a physical checksum verification on the data block and after performing the physical checksum verification on the data block, performing a logical check on data contained in the data block. If both the physical checksum verification and the logical check are successful, then the data block is allowed to be stored to the nonvolatile memory.

According to another aspect of the invention, a method is provided for storing a data block to a nonvolatile memory. The method includes determining whether an operation that will store the data block to the nonvolatile memory will store the data block at a desired storage location associated with the data block. The method also includes only storing the data block to the nonvolatile memory if the operation that will store the data block to the nonvolatile memory will store the data block at the desired storage location associated with the data block.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B illustrates a block diagram of another data verification system in which the present invention may be utilized;

FIG. 6A illustrates a block diagram of a backup system in which the present invention may be utilized;

DETAILED DESCRIPTION OF THE INVENTION

A data validation mechanism is provided for validating the integrity of data that is associated with an application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A data validation mechanism is provided for validating the integrity of data that is associated with an application. In one embodiment, prior to writing a block of data to disk, a physical checksum calculation process is performed on the data block. The physical checksum calculation process provides a mechanism whereby a subsequent physical checksum verification process can be performed to determine whether the data block has been subsequently altered. For example, the physical checksum calculation process may include performing a logical operation on the data within the data block to determine a checksum value and inserting the checksum value into the data block, thus associating a constant checksum value with the data block. The physical checksum verification process, on the other hand, may include subsequently performing the logical operation on the data block and comparing the results with the previously calculated checksum to verify that the data block still has the correct constant checksum value.

After the physical checksum calculation process is performed and prior to storing the data block to disk, a logical check is performed on the data within the data block to verify that certain predetermined characteristics are associated with the data values. If and only if the logical check indicates that certain predetermined characteristics are associated with the data, then the data block is allowed to be written to disk. Thereafter, because the physical checksum calculation process was performed prior to the logical check, when the data block is again required by the application, only a physical checksum verification process is required to verify the integrity of the data block. Although various embodiments of the invention are described herein in the context of disk arrays and disks, the invention is not limited to this context. Embodiments of the invention are applicable to any type of storage medium, such as tape, optical media, or any other type of storage media.

Figure 1:
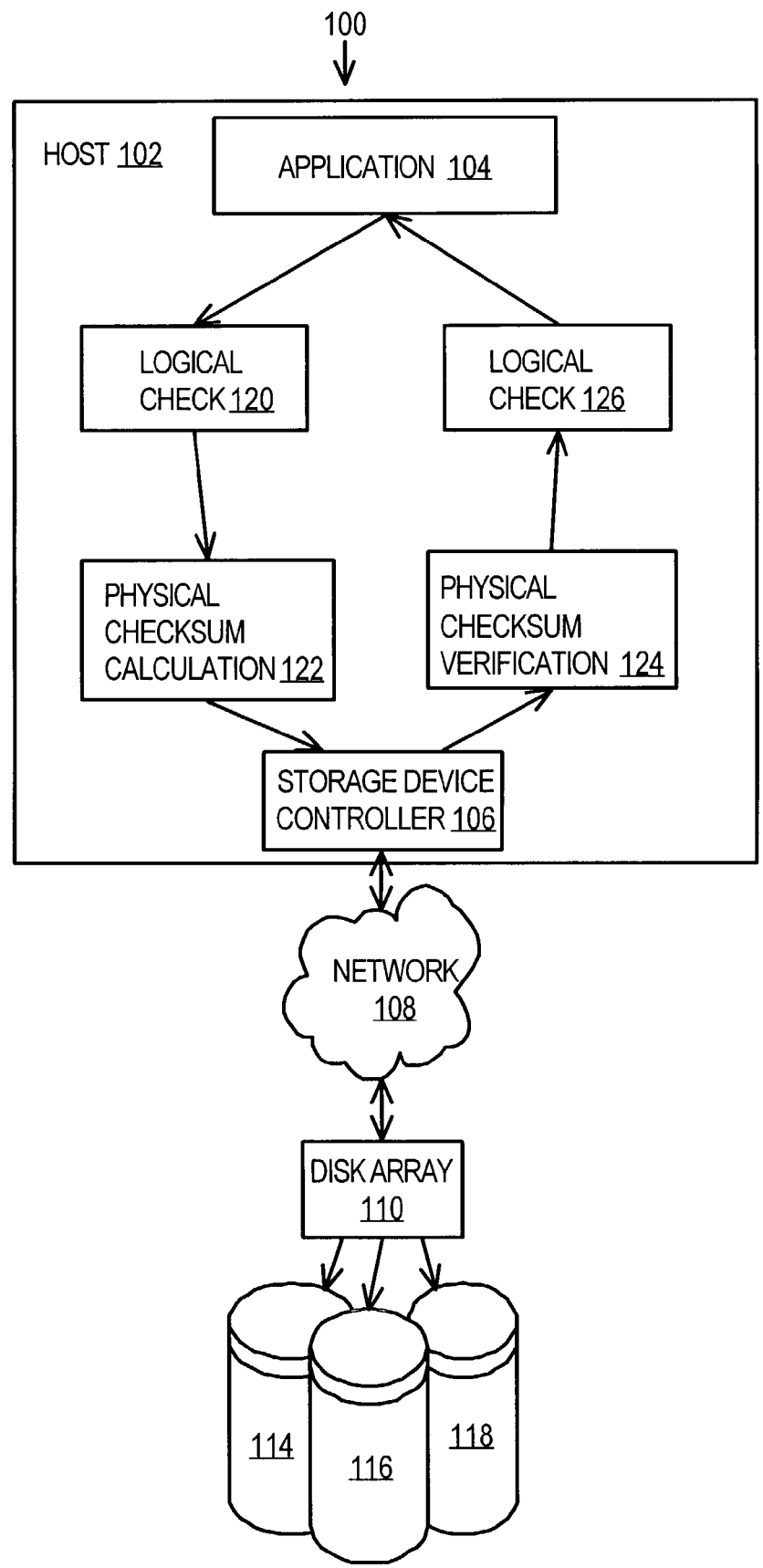
FIG. 1 is a block diagram that illustrates a conventional method for determining the integrity of data that is retrieved from disk by an application.
Figure 2:
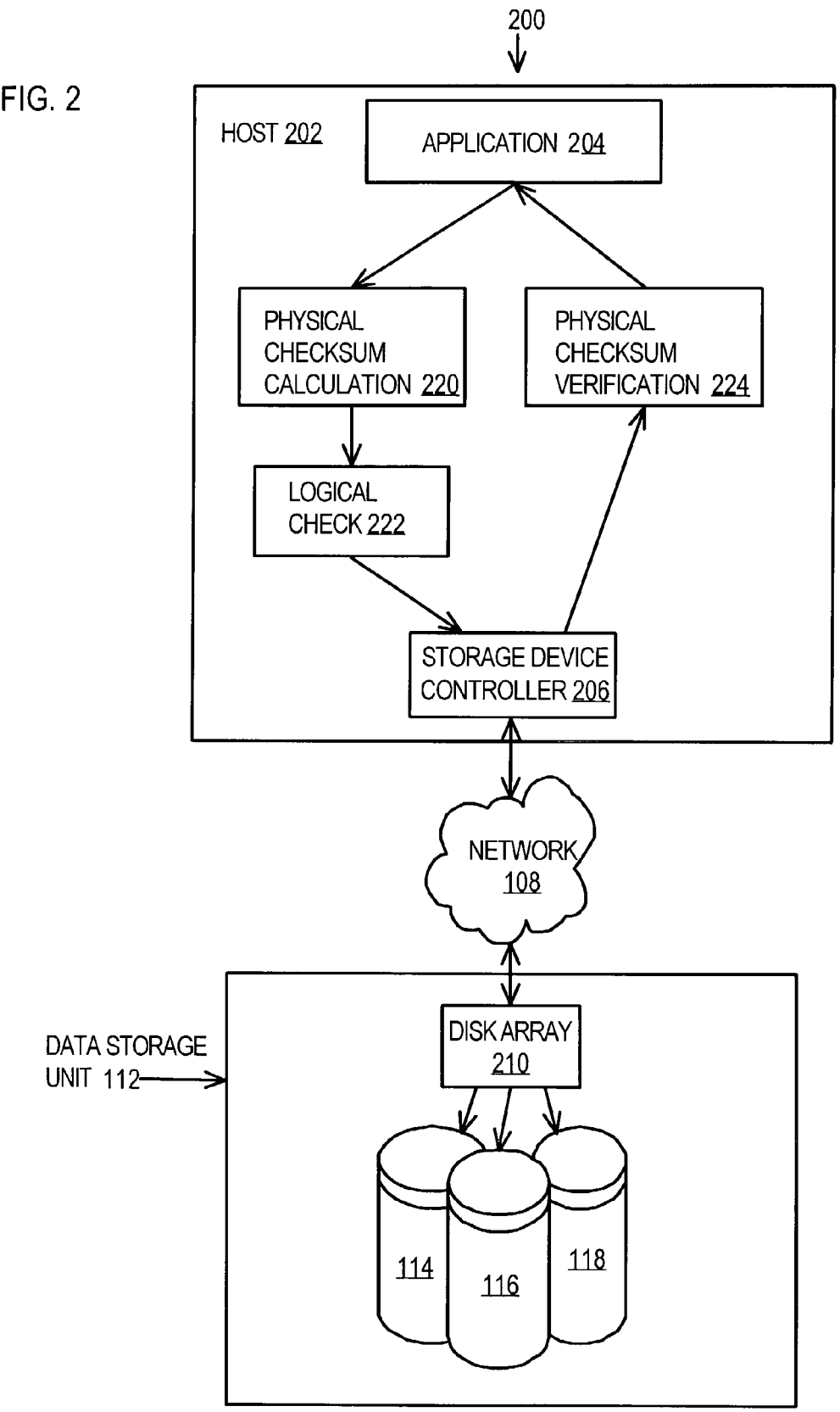
FIG. 2 illustrates a block diagram of a data integrity validation mechanism in which the present invention may be utilized.

FIG. 2 illustrates a block diagram of a data validation mechanism 200 in which the present invention may be utilized. In general, data validation mechanism 200 includes a host computer 202, a network 108 and a data storage unit 112.

Network 108 is a network system that provides a communication medium for communicating between host 202 and data storage unit 112. Network 108 may represent a variety of different forms of communication mediums which includes but is not limited to a serial or parallel medium connection, a local area network (LAN), a wide area network (WAN), the global packet-switched network known as the Internet, a wireless transmission medium, or any other medium for exchanging information between the participants. Network 108 represents a direct cable connection to Disk Array 100 that utilizes a communication protocol such as SCSI or fiber channel, or a combination of different network mediums, for example a combination of LANs and wireless communication networks that are configured to allow Storage device controller 106 and Disk Array 110 to communicate.

Data storage unit 112 represents one or more nonvolatile memory components that are used for storing data for application 204. Data storage unit 112 is not limited to any particular type of storage medium. In particular, as used herein, the term nonvolatile memory is broadly defined as any type of persistent storage or persistent media that can be used for persistently storing information. In this example, data storage unit 112 represents a Redundant Array of Independent Disks or Drives (RAID) that includes a disk array unit 210 and one or more disks 114–118.

Host computer 202 is a computer, or a group of hardware or software components or processes that cooperate or execute in one or more computer systems. In this example, host computer 202 includes an application 204, a physical checksum calculation process 220, a logical check process 222, a physical checksum verification process 224 and a storage device controller 206.

Application 204 may represent a variety of different software applications that are configured to manipulate data and to store and retrieve data from data storage unit 112. For example, application 204 may represent various applications that include but are not limited to database applications, word processing applications, CAD design applications or financial planning applications. Physical checksum calculation process 220, logical check process 222, and physical checksum verification process 224 may represent embedded code within application 204 or may be separate processes, tasks or programs, that may be statically or dynamically linked to application 204.

In one embodiment, prior to causing a block of data to be written to data storage unit 112, application 204 initiates a physical checksum calculation process 220 to generate a checksum value for inserting into the data block. In one embodiment, to generate the checksum value, a logical operation, such as an XOR or ADD operation is performed on the data that is contained in the data block. Based on the vector that results from performing the logical operation, and a desired checksum constant, a checksum value is selected and inserted into the data block. Note that the actual checksum value itself does not have to be used. Rather, any value derived from the checksum value may be used. Thereafter, the integrity of the data block can be determined by performing the same logical operation on the data block and comparing the results with the checksum value stored with the data block.

According to one embodiment of the invention, a known pattern or number is used for a checksum value. The known pattern or number may be randomly selected and the particular selection approach employed may vary over time. A known pattern or number may also be used in combination with a logical operation to determine a checksum value. Although embodiments of the invention are described herein in the context of a checksum value for a data block being stored in the data block, the invention is not limited to this context. Checksum values may be maintained separate from data blocks and made available to entities that perform checksum verifications on the data blocks. For example, checksum values could be passed in routine calls or maintained in a lookup table or database and then retrieved as needed.

After the physical checksum calculation process 220 is performed, logical check 222 is performed on the data within the data block to verify that certain predetermined characteristics are associated with the data values. If the logical check indicates that certain predetermined characteristics are not associated with the data, a recovery sequence may be performed to correct and/or remove the incorrect or corrupted data within the data block.

Alternatively, if the logical check indicates that certain predetermined characteristics are associated with the data, the data block is then forwarded to storage device controller 206. Storage device controller 206 then communicates with disk array unit 210 via network 108 to cause the data block to be stored on one or more disks 114–118.

Thereafter, when the data block is again required by application 204, the data block is retrieved from data storage unit 112 and forwarded to storage device controller 206. A physical checksum verification process 224 is then performed on the data block to verify that the data has not been corrupted since the physical checksum calculation process 220 was performed. In one embodiment, to execute the physical checksum verification process 224, the logical operation used by physical checksum calculation process 220 is performed on the data block. The results of the logical operation are then compared with the checksum stored with the data block to determine whether the integrity of the data block has been maintained since the physical checksum calculation process 220 was performed. Advantageously, because the physical checksum calculation 220 was performed prior to logical check 222, an additional logical check is not required to verify the integrity of the data block. Thus, the data retrieval overhead that is typically required in conventional systems can be significantly reduced.

The aforementioned approach may be applied to blocks individually, or groups of any number of blocks. For example, the checksum calculation and verification processes may be performed at the data file level or on some other logical set of blocks. The particular approach employed may vary depending upon the requirements of a particular application.

Multi-Level Data Verification

Figure 3A:
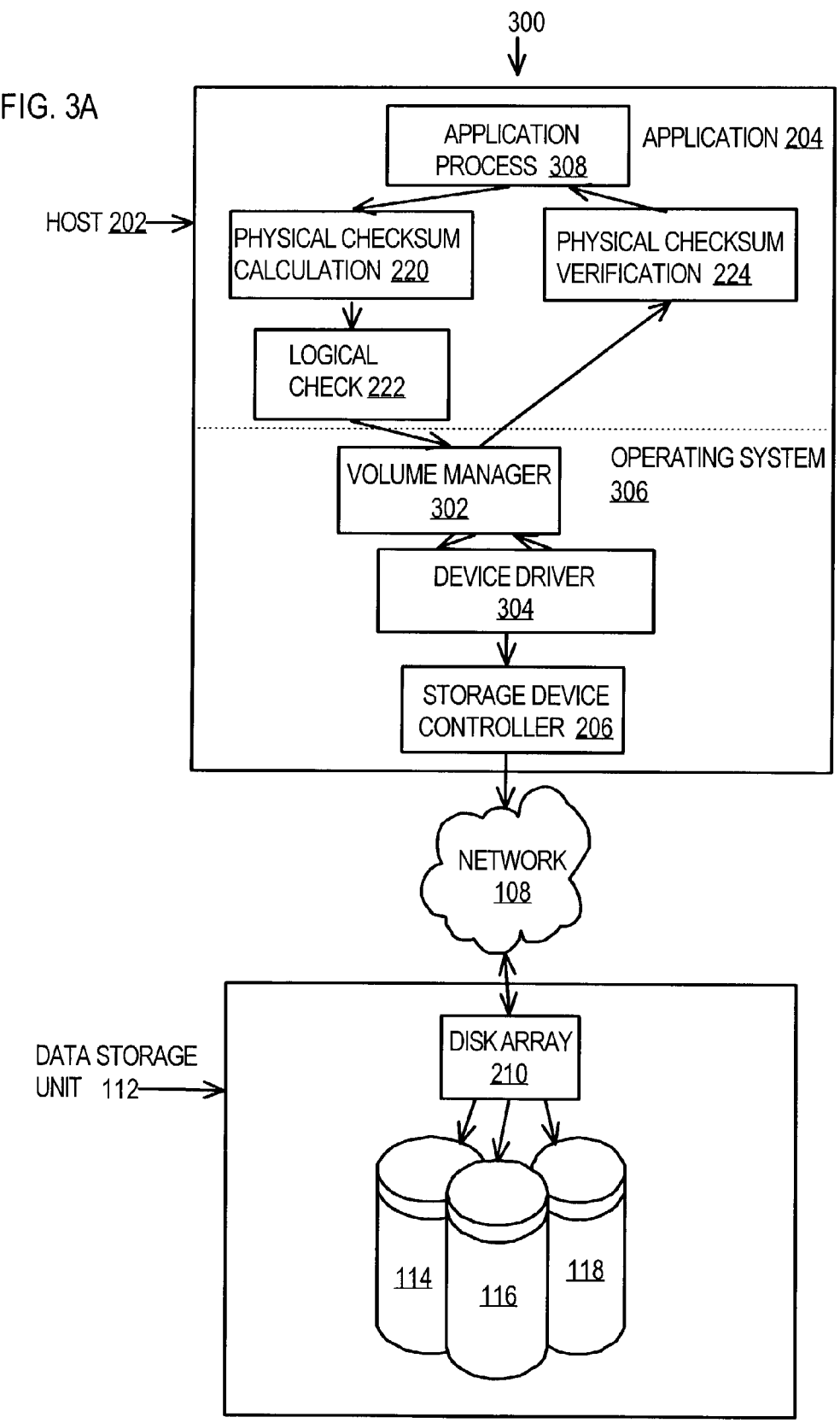
FIG. 3A illustrates a block diagram of a multi-level data verification system in which the present invention may be utilized.

In certain embodiments, the integrity of a data block is verified at multiple levels before being stored to disk. FIG. 3A illustrates an example of a multi-level data verification system whereby the integrity of a data block may be verified at multiple levels prior to being stored to disk. FIG. 3A is similar to FIG. 2 and therefore like components have been numbered alike.

In this example, an operating system 306 includes a volume manager 302 and a device driver 304. The volume manager 302 is configured to interface with application programs, such as application 204, and to manage the storing and retrieving of data to and from nonvolatile memory (disks 114–118). Device driver 304 provides an interface for communicating between operating system 306 and storage device controller 206. In one embodiment, volume manager 302 and/or device driver 304 are configured to execute a physical checksum verification process to verify that a data block has not been corrupted since performing physical checksum calculation process 220 (for example, physical checksum verification procedure 224). By performing a physical checksum verification process at different processing levels between application process 308 and the disks 114–118, the integrity of the data can be further verified before it is actually written to disk. In addition, the described multi-level verification scheme can help identify where the data became corrupted as the multi-level verification tests help to isolate where the data was corrupted. Furthermore, in certain embodiments, the multi-level verification scheme is configured to detect corrupted data before it is written to disk and to give the application, or other process, the ability to correct the corrupted data before it is written to disk. For example, if data that has been identified as corrupted is allowed to be written to disk, the next time the application reads the corrupted data from disk, which may be many days, months or even years latter, the application may not have the information and/or the ability to correct the corrupted data. However, by not allowing data to be written to disk that has been identified as corrupted, a verification scheme is provided that reduces the chance that the application will read corrupted data from disk.

In certain embodiments, the multi-level data verification system may include the performance of data integrity checks at other components that are along the path between application 204 and disks 114–118. For example, in one embodiment, storage device controller 206 and disk array 210 may be configured to perform data integrity checks on data associated with application 204. For example, in certain embodiments, storage device controller 206 is configured to execute a physical checksum verification process to verify that a data block has not been corrupted since performing physical checksum calculation process 220. By performing a physical checksum verification process at storage device controller 206, the verification system can verify that components other than application 204, for example operating system 306, have not corrupted the integrity of the data. In addition, by configuring disk array 210 to execute a physical checksum verification process, the verification system can verify that the data was not corrupted by any other component, including network 108. Moreover, by configuring disk array 210 to execute a physical checksum verification process, the verification system can significantly reduce the chance that corrupted data will be stored on disks 114–118.

For example, FIG. 3B illustrates an example of a multi-level data verification system 350 whereby the integrity of a data block is verified by performing a physical checksum verification procedure prior to storing a data block to disk. FIG. 3B is similar to FIG. 3A and therefore like components have been numbered alike. In this example, after application 204 performs the physical checksum calculation 220, the block of data is forwarded to storage device controller 206 without performing a logical check on the data within the data block. Storage device controller 206 then forwards the data block via network 108 to disk array 210 for storage within data storage unit 112. In this example, upon receiving the data block, disk array 210 performs a physical checksum verification process 352 to verify that the data has not been corrupted since the physical checksum calculation 220 was performed by application 204. If it is determined that the data block has not been corrupted then the data block is written to disk. Alternatively, if it determined that the data block has been corrupted then an error flag is set and the data block is not written to disk. By performing a physical checksum verification process at disk array 210, the verification system 350 can verify the integrity of the data immediately prior to storing the data block to disk. In particular, the verification system 350 can verify that components other than application 204, for example operating system 306 or storage device controller 206 did not corrupt the data prior to storing the data block to disk.

In addition, as previously described for FIG. 3A, additional data integrity checks may be performed at other components that are along the path between application 204 and disks 114–118. For example, volume manager 302, device driver 304 and storage device controller 206 may also be configured to perform data integrity checks on data blocks that are to be stored to disk. Furthermore, application 204 may optionally perform physical checksum verification 224 when the data block is subsequently retrieved from disk.

Verification Sequence for Writing Data to Nonvolatile Memory

Figure 4A:
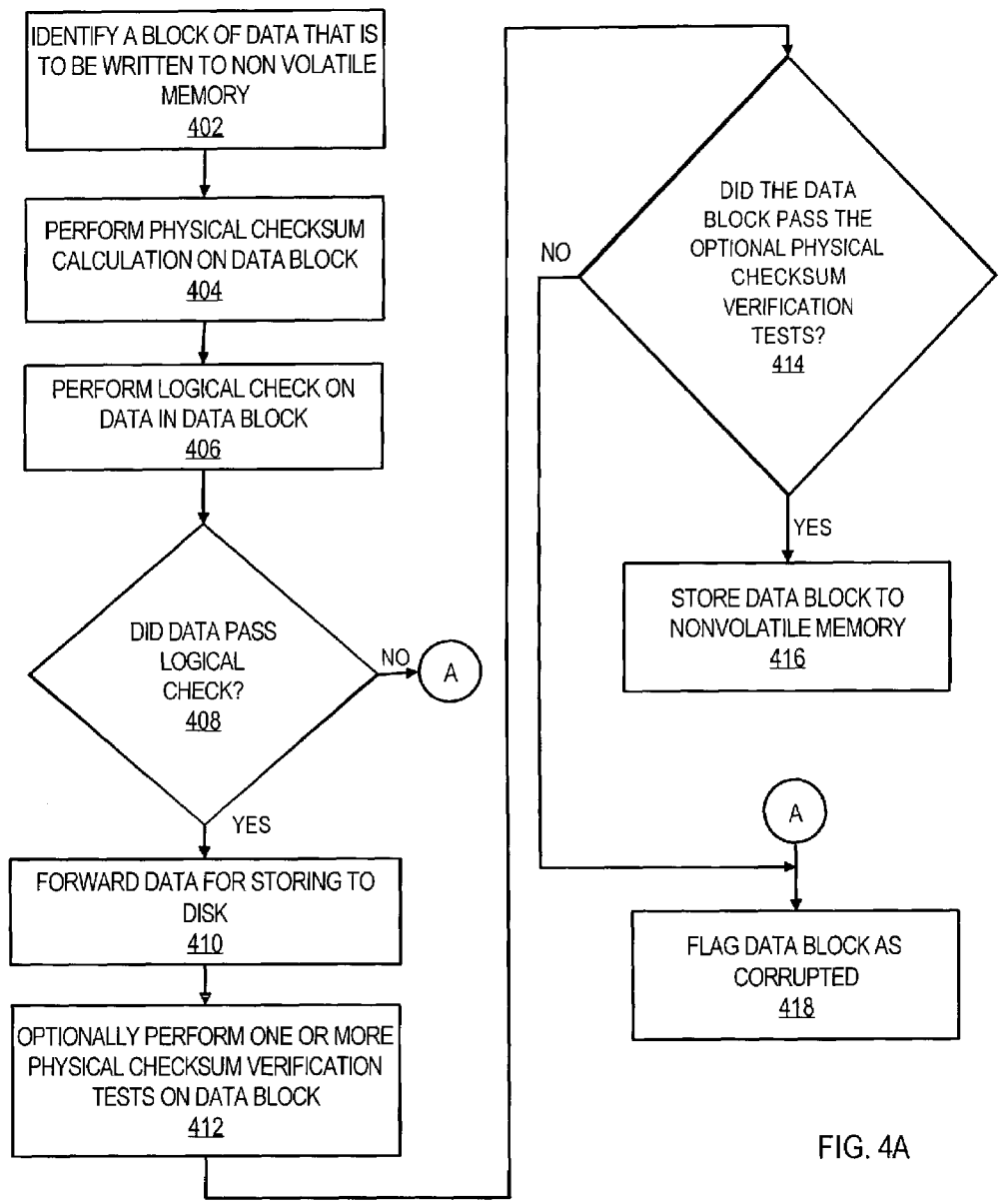
FIG. 4A is a flow diagram that illustrates an example of a multi-level verification sequence for verifying the integrity of data that is to be written to nonvolatile memory.

FIG. 4A is a flow diagram that illustrates an example of a multi-level verification sequence for verifying the integrity of data that is to be written to nonvolatile memory in accordance with certain embodiments of the invention. For explanation purposes, FIG. 4A will be described in reference to FIG. 3A.

At block 402 a block of data that is to be written to nonvolatile memory is identified. For example, a block of data that has been updated by application 204 may be required to be written to one or more disks 114–118.

At block 404, a physical checksum calculation process is performed on the block of data. For example, physical checksum calculation process 220 may be initiated to determine a checksum value for inserting into the data block.

At block 406, a logical check is optionally performed on the data within the data block. For example, a logical check may be performed on the data to verify that certain predetermined characteristics are associated with the data values.

At block 408, assuming that the logical check was performed, a decision is made as to whether the data within the data block passed the logical check. If the data passes the logical check then the process proceeds to block 410. Alternatively, if the data did not pass the logical check, then the process proceeds to block 418.

At block 410, the data is forwarded for storing in nonvolatile memory. For example, the data block may be forwarded to operating system 306 for storage on the one or more disks 114–116. According to one embodiment of the invention, the request to store that data in nonvolatile memory includes data that identifies both the data and the location where the data is to be stored in nonvolatile memory. The data that specifies the location where the data is to be stored in nonvolatile memory may be used to verify the location of stored data, as is described in more detail hereinafter.

At block 412, one or more components may optionally perform a physical checksum verification procedure to verify the integrity of the data with the data block. For example, components such as the volume manager 302, device driver 304, storage device controller 206 and disk array 210 may be configured to perform a physical checksum verification procedure to verify the integrity of the data based on the checksum value.

If an optional physical checksum verification procedure is performed by one or more components, then at block 414, for each checksum verification procedure performed, a decision is made as to whether the data within the data block passed the physical checksum verification test. If the data passes the optional physical checksum verification tests, then at block 416, the data block is written to nonvolatile memory. Alternatively, if the data did not pass one or more of the optional physical checksum verification tests, then at block 418 the data block is flagged as containing corrupted data and thus not written to disk.

Verification Sequence for Retrieving Data from Nonvolatile Memory

Figure 4B:
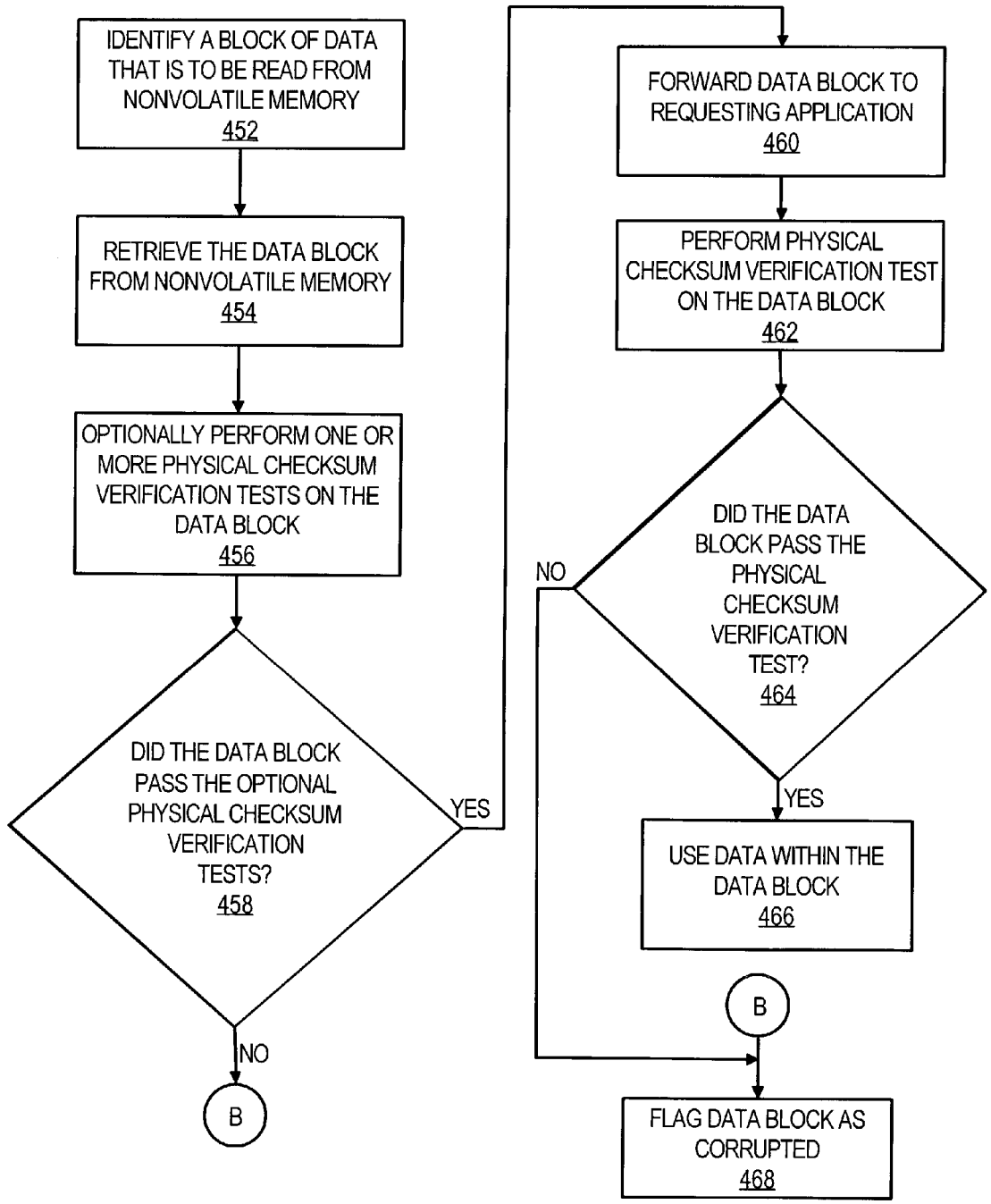
FIG. 4B is a flow diagram that illustrates an example of a multi-level verification sequence for verifying the integrity of data that is read from nonvolatile memory.

FIG. 4B is a flow diagram that illustrates an example of a multi-level verification sequence for verifying the integrity of data that is read from nonvolatile memory in accordance with certain embodiments of the invention. For explanation purposes, FIG. 4B is also described in reference to FIG. 3A.

At block 452 a block of data that is stored in nonvolatile memory is identified. For example, a block of data that was previously updated by application 204 may be required to be read from the one or more disks 114–118.

At block 454, the data block is located and retrieved from nonvolatile memory.

At block 456, one or more components may optionally perform a physical checksum verification procedure to verify the integrity of the retrieved data block. For example, components such as disk array 210, storage device controller 206, device driver 304, and volume manager 302, may be configured to perform a physical checksum verification procedure to verify the integrity of the retrieved data based on a known checksum constant value.

If one or more components perform an optional physical checksum verification procedure to verify the integrity of the retrieved data, then at block 458, for each checksum verification procedure performed, a decision may be made as to whether the data within the data block passed the physical checksum verification test. If the data did not pass one or more of the optional physical checksum verification tests, then the process proceeds to block 468.

Alternatively, if the data passes the optional physical checksum verification tests, then at block 460, the data block is forwarded to the requesting application.

At block 462, the requesting application performs a physical checksum verification procedure to verify the integrity of the retrieved data block. For example, application 204 may be configured to perform a physical checksum verification procedure 224 to verify the integrity of the retrieved data based on a known checksum constant value.

In certain embodiments, if the retrieved data block has been found to have passed one or more of the optional physical checksum verification tests since being read from nonvolatile memory, the requesting application may optionally skip the physical checksum verification procedure in block 462.

At block 464 a decision is made as to whether the data block passed the checksum verification procedure 224 that was performed by the application. If the data did not pass the physical checksum verification test, then at block 468 the data block is flagged as containing corrupted data.

Alternatively, if the data passes the physical checksum verification procedure 224, then at block 466, the data within the data block may be used by the requesting application.

Block Location Verification

Figure 5:
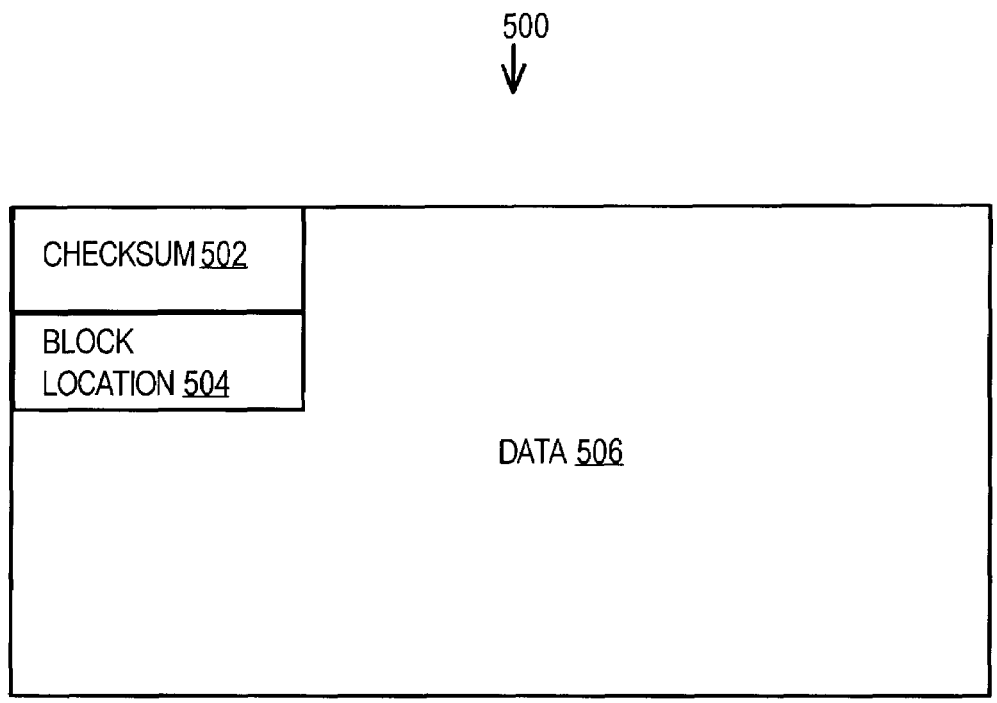
FIG. 5 illustrates a mechanism for verifying the location that a block is to be written to nonvolatile memory.

In certain embodiments, a mechanism is provided for verifying the block location that is to be used for storing a particular data block into nonvolatile memory (the "desired block address"). For example, a desired block address (or a portion thereof) may be stored in each data block to identify a physical or logical address (or a portion thereof) where the data block is to be stored in nonvolatile memory. FIG. 5 illustrates a mechanism whereby a block location identifier 504 is maintained within a block 500. In one embodiment, the block location identifier 504 represents the physical address of where the data block 500 is to be stored in nonvolatile memory. By storing the block location identifier 504 within block 500, components, such as disk array 210, can verify that the data block is stored in the correct location in nonvolatile memory. Note that the entire address does not have to be used for this verification. For example, a portion of an address, such as N number of lower order bits of an address may be used.

In certain embodiments, application 204, or a component associated with application 204, maintains mapping data that specifies the topology of the one or more disks 114–118. Using the mapping data, the physical address at which a block is to be stored can be identified and stored within the block. Upon receiving a data block, disk array 210 verifies that the physical address associated with the block location identifier 504 correctly corresponds to the location at which the block is to be stored in nonvolatile memory. In some situations, block identifier 504 may not indicate an actual physical location in data storage unit 112 where data block 500 is to be stored. This may occur if application 204 operates on data blocks at a different level than data storage unit 112. For example, application 204 may operate on data blocks at a file level, based upon a particular operating system platform. In this situation, application 204 or the corresponding operating system may use the logical location of data block 500 for the block location identifier 504 within data block 500. Alternatively, application 203 may operate on different size blocks than data storage unit 112. In either situation, the entity performing the location verification cannot perform a simple comparison of the location specified by block location identifier 504 and the location at which data block 500 will be stored on data storage unit 112. Instead, the entity performing the location verification, for example data storage unit 112, uses the mapping data to determine a physical address from the logical address contained in block location identifier 504 so that the verification can be performed. The type of mapping data used may vary depending upon the requirements of a particular application and the invention is not limited to any particular mapping data. For example, in some situations, multiple mappings may be used for multiple logical "layers."

As an alternative to generating and maintaining mapping data that defines the relationship between logical and physical addresses, an algorithm may be used to determine a physical address from a logical address. This alternative eliminates the need to maintain mapping data, but requires that the determination be made "on the fly" which may require additional computational resources and time. An algorithm may be used in combination with mapping data to determine a physical address associated with a logical address. For example, an algorithm may be used to determine one portion of a physical address and mapping data used to determine another portion of the physical address.

Block location verification may be initiated in a variety of ways depending upon the requirements of a particular application and the invention is not limited to any particular approach for initiating block location verification. For example, the application program interface (API) employed by operating system 306 may include verification attributes for routine calls to store or retrieve data from data storage unit 112. The verification attributes may specify any attribute of block location verification, for example, whether block location verification is to be performed and if so, under what conditions. The verification attributes may also specify particular blocks to which block location verification is to be applied. For example, application 204 invokes a routine call to store block 500 to data storage unit 112. The invocation (call) includes verification data, which in this situation, indicates that block location verification is to be performed. Disk array 210 examines the verification data associated with the invocation to determine whether block location verification is to be performed. After determining that the verification data indicates that block location verification is to be performed, disk array 210 then causes the requested block location verification to be performed.

Alternatively, instead of including verification attributes in routine calls, attribute data may be included in block 500 and then examined and evaluated by an entity, for example, data storage unit 112, that is to perform the verification. The attribute data specifies any desired attribute of block location verification, for example, whether block location verification is to be performed and if so, under what conditions. For example, application 204 inserts verification data in block 500 to indicate that block location verification is to be performed on block 500. Application 204 invokes a routine to store block 500 to data storage unit 112. Disk array 210 examines the contents of block 500 to determine whether block 500 contains any verification data that indicates the block location verification is to be performed. In the present example, disk array 210 determines that block 500 contains verification data that indicates block location verification is to be performed and causes the block location verification to be performed.

In certain embodiments, an error is flagged if the block location identifier 504 does not correctly correspond to the location at which the block is to be stored, thus causing the block not to be stored to nonvolatile memory. For example, the operating system 306 and/or application 204 may be notified if the block location identifier 504 does not correctly correspond to the location at which the block is to be stored. In one embodiment, the block location identifier 504 is used to verify that the block is read from the correct location in nonvolatile memory. For example, by comparing the block location identifier 504 with the physical location in memory from where the data was retrieved, disk array 210 can verify that the data block was retrieved from the correct location in nonvolatile memory.

In certain embodiments, multiple block locations identifiers may be stored within a block that identify multiple locations for which the block is to stored. For example, to provide for a mirroring database system, multiple block location identifiers may be stored in each data block to identify the multiple locations that the data block is to be stored in nonvolatile memory. Alternatively, a single block location identifier 504 may be included in each block and disk array 210 may be configured to verify the address and to determine one or more other addresses for mirroring the data block in nonvolatile memory.

Verification Sequence in Performing Backups

In certain embodiments, a data validation mechanism is provided for backing-up data that is associated with one or more application programs. FIG. 6A illustrates a backup system 600 in which a backup process 602 residing on host 202 performs a physical checksum verification procedure prior to storing a data block to backup unit 604. In this example, backup unit 604 is not limited to any particular type of backup mechanism or medium and thus may include a variety of different types of backup components that may include but is not limited to tape drive units, ZIP drive units, DVD or CD ROM units, and floppy disk units.

In one embodiment, in backing-up one or more blocks of data, backup process 602 retrieves the data blocks from data storage unit 112 and performs a physical checksum verification procedure on each block to verify the integrity of the data. As previously shown above, because the physical checksum calculation 220 was performed prior to logical check 222, an additional logical check is not required to verify the integrity of the data block. Thus, the overhead that is typically required in a conventional backup systems can be significantly reduced. In addition, by performing a physical checksum verification process at backup process 602, a backup verification system is provided that can significantly reduce the chance that corrupted data will be stored on backup unit 604.

In certain embodiments, upon determining that the data has been corrupted, the backup process 602 causes the corrupted data not to be written to backup unit 604. The backup process 602 may instead communicate with application 204, or other process, to correct the corrupted data before it is allowed to be written to backup unit 604. By not allowing the corrupted data to be written to backup unit 604, a verification scheme is provided that reduces the chance that the corrupted data will be stored on backup unit 604. Additionally, although FIG. 6A depicts logical check 222, the invention does not require that this check be performed and in certain embodiments system 600 may not include the performance of logical check 222. For example, in one embodiment, system 600 does not include logical check 222 but instead relies on one or more physical checksum verification processes to perform data integrity checks on the data that is written to and retrieved from data storage unit 112.

Also, in certain embodiments, instead of receiving the data blocks directly from storage device controller 206 or other operating system components, the backup process 602 may be configured to communicate with the application 204 to receive the data blocks. Upon receiving a data block, backup process 602 may still be configured to perform physical checksum procedure 224 to ensure that the data is not corrupted before being written to backup unit 604.

Figure 6B:
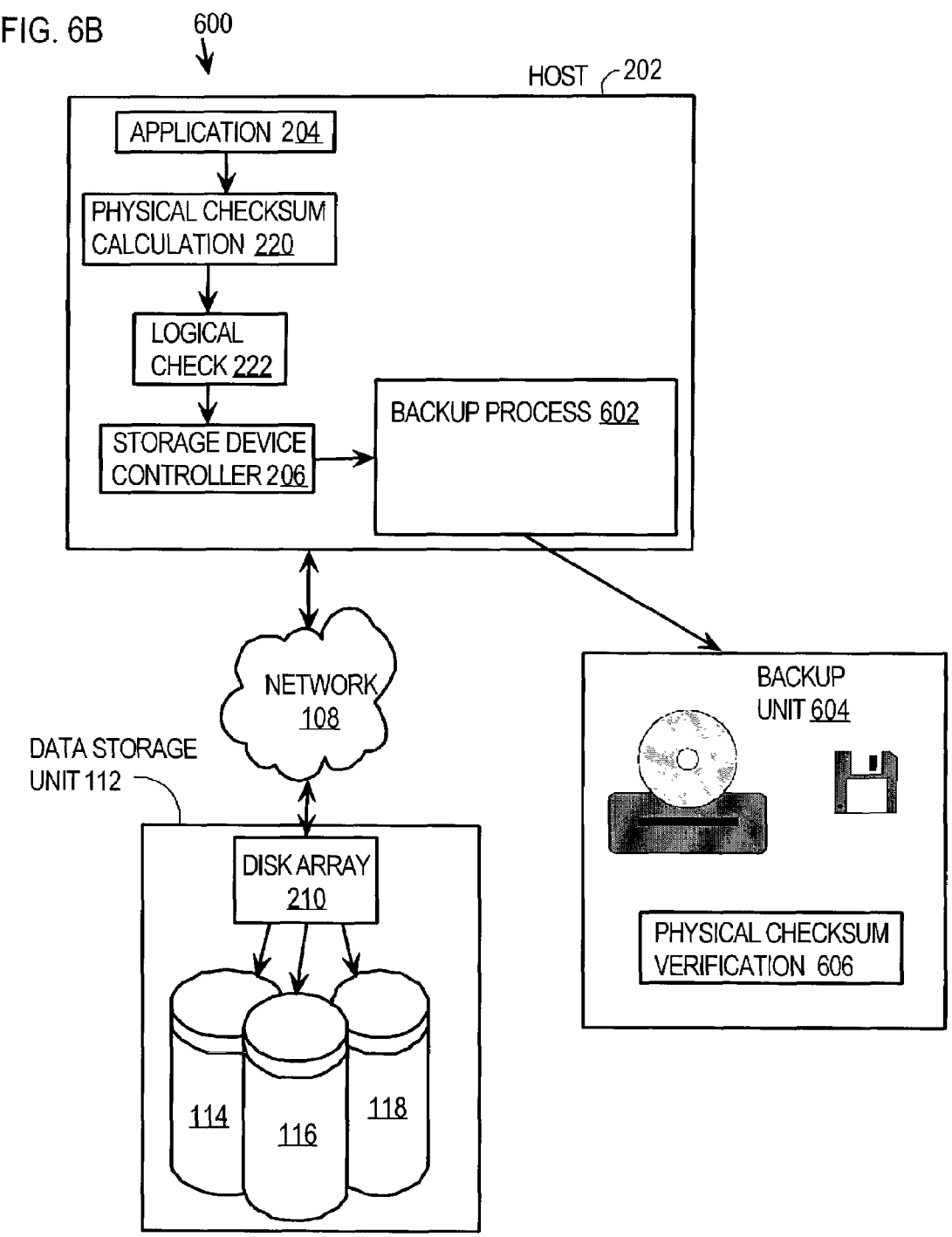
FIG. 6B illustrates a block diagram of another backup system in which the present invention may be utilized.

The invention is not limited to the physical checksum verification procedure being performed on host 202. For example, as depicted in FIG. 6B, a physical checksum verification 606 is performed at backup unit 604. Performing the physical checksum verification on backup unit 604 may be done in addition to, or in place of physical checksum verification 224 and the invention is not limited to any particular approach.

Figure 6C:
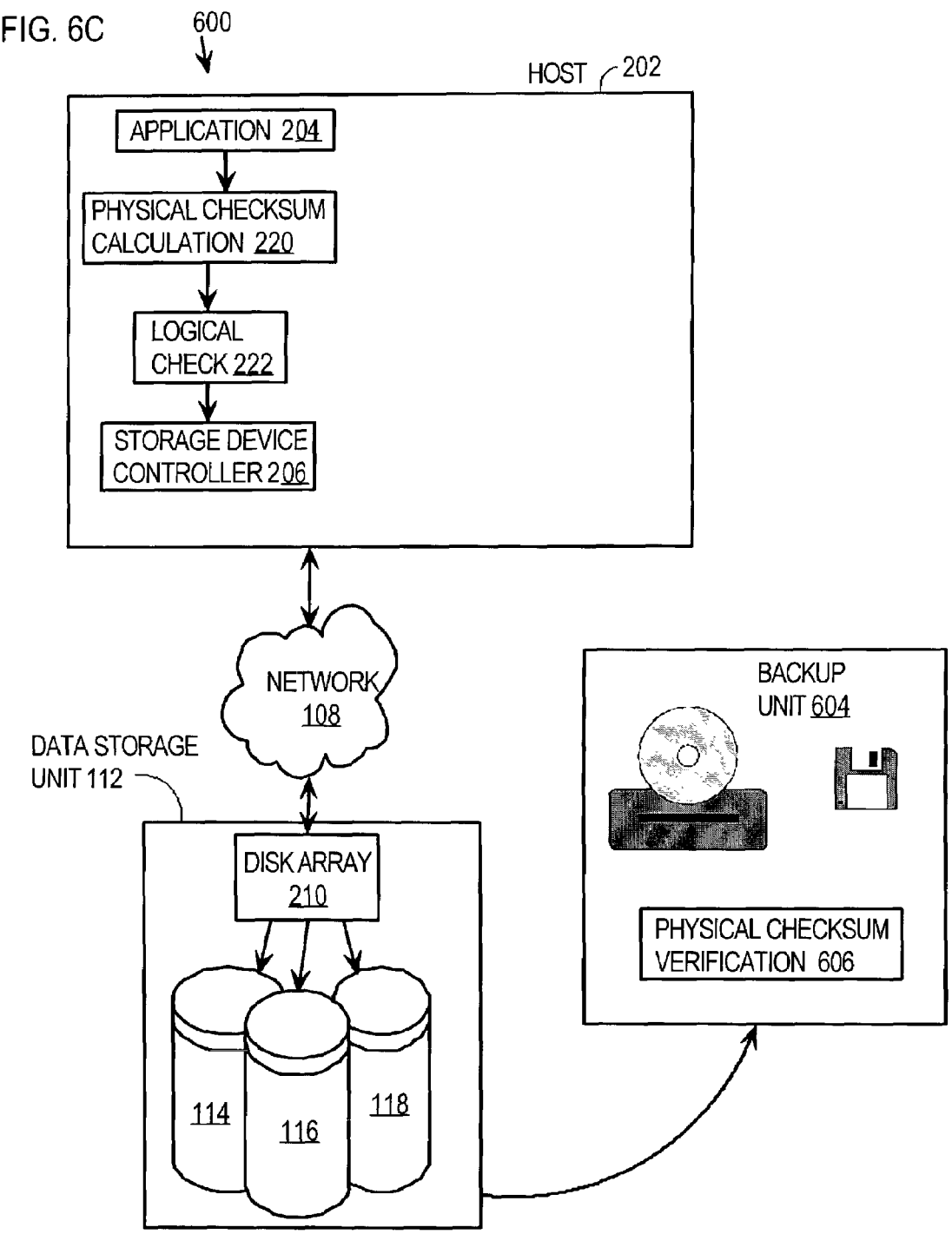
FIG. 6C illustrates a block diagram of yet another backup system in which the present invention may be utilized.

In some applications, the backup of data may be performed by a data storage unit itself, instead of a host. FIG. 6C depicts an arrangement where data backups are performed by data storage unit 112. Specifically, data storage unit 112 copies data to backup unit 604. The data backup performed by data storage unit 112 may occur completely transparent to host 202. Accordingly, backup process 602, depicted in FIGS. 6A and 6B is not used. Instead, according to an embodiment of the invention, a backup process invoked by data storage unit 112 causes the data to be backed up to backup unit 604. The backup process invoked by data storage unit 112 may reside on data storage unit 112 or reside external to data storage unit 112, depending upon the requirements of a particular application.

Hardware Example

Figure 7:
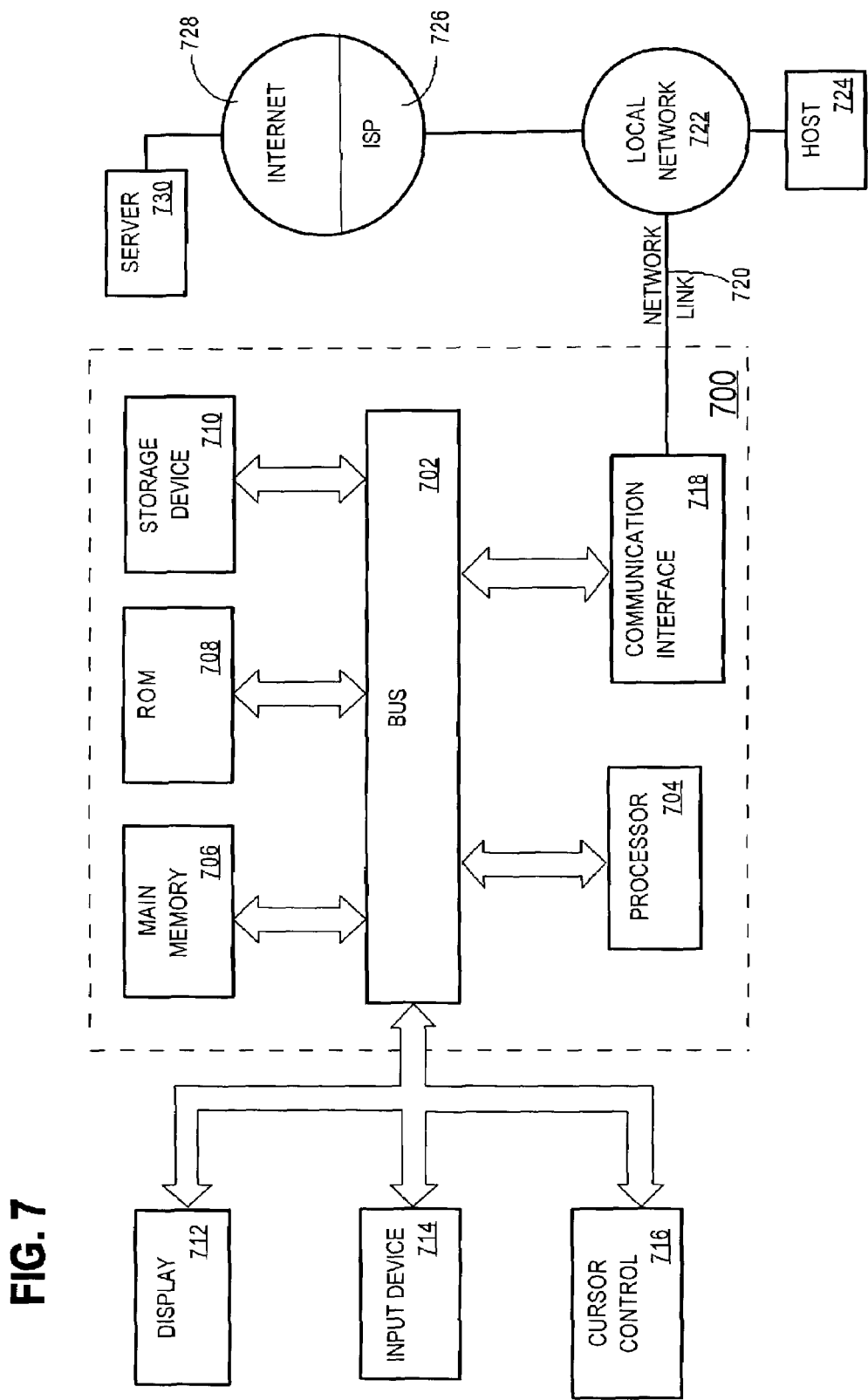
FIG. 7 is a block diagram of a computer system with which an embodiment may be out.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing a data integrity verification mechanism. According to one embodiment of the invention, a data integrity verification mechanism is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, nonvolatile media, volatile media, and transmission media. Nonvolatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for data integrity verification as described herein.

The received code may be executed by processor 704 as it is received, and/or stored in storage device 710, or other nonvolatile storage for later execution. In this manner, computer system 700 may obtain application code in the form of a carrier wave.

Alternatives, Extensions

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for evaluating a data block, the method comprising the computer-implemented steps of:
    performing a physical checksum verification on the data block; and
    verifying whether address data contained within the data block specifies a location in nonvolatile memory where the data block is to be stored by comparing the address data contained within the data block to the location in the nonvolatile memory where an operation that stores the data block to the nonvolatile memory will store the data block.

2. The method as recited in claim 1, wherein the physical checksum verification is performed using a specified pattern or number assigned to the data block.

3. The method as recited in claim 1, wherein the physical checksum verification is performed using a checksum value determined based upon the data block.

4. The method as recited in claim 1, further comprising performing a logical check on data contained in the data block.

5. A method for storing a data block to a nonvolatile memory, the method comprising the computer-implemented steps of:
    performing a physical checksum verification on the data block;
    after performing the physical checksum verification on the data block, performing a logical check on data contained in the data block; and
    if both the physical checksum verification and the logical check are successful, then allowing the data block to be stored to the nonvolatile memory.

6. The method as recited in claim 5, further comprising storing, in association with the data block, checksum data used in the physical checksum verification to the nonvolatile memory.

7. The method as recited in claim 5, further comprising performing a second physical checksum verification on the data block to determine whether data contained in the data block was corrupted after the prior physical checksum verification was performed.

8. The method as recited in claim 5, wherein the physical checksum verification is performed using a checksum value calculated based upon the data block.

9. The method as recited in claim 5, wherein the physical checksum verification is performed using a specified pattern or number assigned to the data block.

10. The method as recited in claim 5, wherein the physical checksum verification and the logical check are performed by a database application program.

11. A computer-readable medium for evaluating a data block, the computer-readable medium carrying one or more sequences of one or more instructions which, when executed by one or more processors, cause the one or more processors to perform the steps of:
    performing a physical checksum verification on the data block; and
    verifying whether address data contained within the data block specifies a location in nonvolatile memory where the data block is to be stored by comparing the address data contained within the data block to the location in the nonvolatile memory where an operation that stores the data block to the nonvolatile memory will store the data block.

12. The computer-readable medium as recited in claim 11, wherein the physical checksum verification is performed using a specified pattern or number assigned to the data block.

13. The computer-readable medium as recited in claim 11, wherein the physical checksum verification is performed using a checksum value determined based upon the data block.

14. The computer-readable medium as recited in claim 11, further comprising performing a logical check on data contained in the data block.

15. A computer-readable medium for storing a data block to a nonvolatile memory, the computer-readable medium carrying one or more sequences of one or more instructions which, when executed by one or more processors, cause the one or more processors to perform the steps of:

performing a physical checksum verification on the data block;

after performing the physical checksum verification on the data block, performing a logical check on data contained in the data block; and if both the physical checksum verification and the logical check are successful, then allowing the data block to be stored to the nonvolatile memory.

16. The computer-readable medium as recited in claim 15, further comprising storing, in association with the data block, checksum data used in the physical checksum verification to the nonvolatile memory.

17. The computer-readable medium as recited in claim 15, further comprising performing a second physical checksum verification on the data block to determine whether data contained in the data block was corrupted after the prior physical checksum verification was performed.

18. The computer-readable medium as recited in claim 15, wherein the physical checksum verification is performed using a checksum value calculated based upon the data block.

19. The computer-readable medium as recited in claim 15, wherein the physical checksum verification is performed using a specified pattern or number assigned to the data block.

20. The computer-readable medium as recited in claim 15, wherein the physical checksum verification and the logical check are performed by a database application program.

21. An apparatus for evaluating a data block comprising:
a memory; and
a verification mechanism configured to:
perform a physical checksum verification on the data block; and
verify whether address data contained within the data block specifies a location in nonvolatile memory where the data block is to be stored by comparing the address data contained within the data block to the location in the nonvolatile memory where an operation that stores the data block to the nonvolatile memory will store the data block.

22. The apparatus as recited in claim 21, wherein the verification mechanism is further configured to perform the physical checksum verification using a specified pattern or number assigned to the data block.

23. The apparatus as recited in claim 21, wherein the verification mechanism is further configured to perform the physical checksum verification using a checksum value determined based upon the data block.

24. The apparatus as recited in claim 21, wherein the verification mechanism is further configured to perform a logical check on data contained in the data block.

25. An apparatus for storing a data block to a nonvolatile memory composing:
a memory; and
a verification mechanism configured to:
perform a physical checksum verification on the data block;
after performing the physical checksum verification on the data block, perform a logical check on data contained in the data block; and
if both the physical checksum verification and the logical check are successful, then allow the data block to be stored to the nonvolatile memory.

26. The apparatus as recited in claim 25, wherein the verification mechanism is further configured to allow the storing, in association with the data block, of checksum data used in the physical checksum verification to the nonvolatile memory.

27. The apparatus as recited in claim 25, wherein the verification mechanism is further configured to perform a second physical checksum verification on the data block to determine whether data contained in the data block was corrupted after the data block was stored to the nonvolatile memory.

28. The apparatus as recited in claim 25, wherein the verification mechanism is further configured to perform the physical checksum verification using a checksum value calculated based upon the data block.

29. The apparatus as recited in claim 25, wherein the verification mechanism is further configured to perform the physical checksum verification using a specified pattern or number assigned to the data block.

* * * * *

UNITED STATES PATENT AND TRADEMARK OFFICE
CERTIFICATE OF CORRECTION

| | | |
|---|---|---|
| PATENT NO. | : 7,020,835 B2 | Page 1 of 1 |
| APPLICATION NO. | : 10/133002 | |
| DATED | : March 28, 2006 | |
| INVENTOR(S) | : Juan R. Loaiza et al. | |

It is certified that error appears in the above-identified patent and that said Letters Patent is hereby corrected as shown below:

<u>Column 18</u>
Claim 25, line 11: delete "composing:" and insert --comprising:--.

Signed and Sealed this

Eighteenth Day of July, 2006

JON W. DUDAS
*Director of the United States Patent and Trademark Office*